United States Patent
Kawasaki

(10) Patent No.: US 9,374,844 B2
(45) Date of Patent: Jun. 21, 2016

(54) ELECTRONIC DEVICE, CONNECTION DESTINATION SWITCHING METHOD AND STORAGE MEDIUM

(71) Applicant: Kabushiki Kaisha Toshiba, Minato-ku, Tokyo (JP)

(72) Inventor: Hirokazu Kawasaki, Fussa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/497,173

(22) Filed: Sep. 25, 2014

(65) Prior Publication Data

US 2015/0148097 A1 May 28, 2015

(30) Foreign Application Priority Data

Nov. 26, 2013 (JP) .................................. 2013-244018

(51) Int. Cl.
*H04W 16/16* (2009.01)
*H04W 76/04* (2009.01)
*H04W 36/24* (2009.01)
*H04W 36/08* (2009.01)
*H04W 84/12* (2009.01)
*H04W 84/18* (2009.01)

(52) U.S. Cl.
CPC .............. *H04W 76/04* (2013.01); *H04W 36/24* (2013.01); *H04W 36/08* (2013.01); *H04W 84/12* (2013.01); *H04W 84/18* (2013.01)

(58) Field of Classification Search
CPC ...................................................... H04W 16/16
USPC ............................................. 455/552.1, 553.1
See application file for complete search history.

(56) References Cited

U.S. PATENT DOCUMENTS

| 7,995,468 | B2 | 8/2011 | Sakai |
| 8,471,963 | B2 | 6/2013 | Sakai |
| 2008/0058031 | A1* | 3/2008 | Deprun ............. H04W 52/0229 455/574 |
| 2010/0054121 | A1 | 3/2010 | Sakai |
| 2011/0255398 | A1 | 10/2011 | Sakai |
| 2013/0178163 | A1* | 7/2013 | Wang .................... H04W 4/008 455/41.2 |
| 2014/0235170 | A1* | 8/2014 | Zhang ................... H04W 4/008 455/41.2 |
| 2014/0315490 | A1* | 10/2014 | Hughes ................. H04W 4/008 455/41.2 |

FOREIGN PATENT DOCUMENTS

| JP | 2010-056916 A | 3/2010 |
| JP | 2012-169971 A | 9/2012 |
| JP | 2013-058903 A | 3/2013 |

* cited by examiner

*Primary Examiner* — Christopher M Brandt
(74) *Attorney, Agent, or Firm* — Knobbe, Martens Olson & Bear LLP

(57) ABSTRACT

According to one embodiment, a electronic device includes a detector, a first connection processor and a second connection processor. The detector is configured to detect, when the electronic device is connected to a first apparatus which is a connection destination of the first wireless communication, a second apparatus which is a connection destination of the second wireless communication. The first connection processor is configured to connect the electronic device to the detected second apparatus. The second connection processor is configured to switch the connection destination of the first wireless communication from the first apparatus to a third apparatus when the second apparatus is detected or the device is connected to the second apparatus.

5 Claims, 3 Drawing Sheets

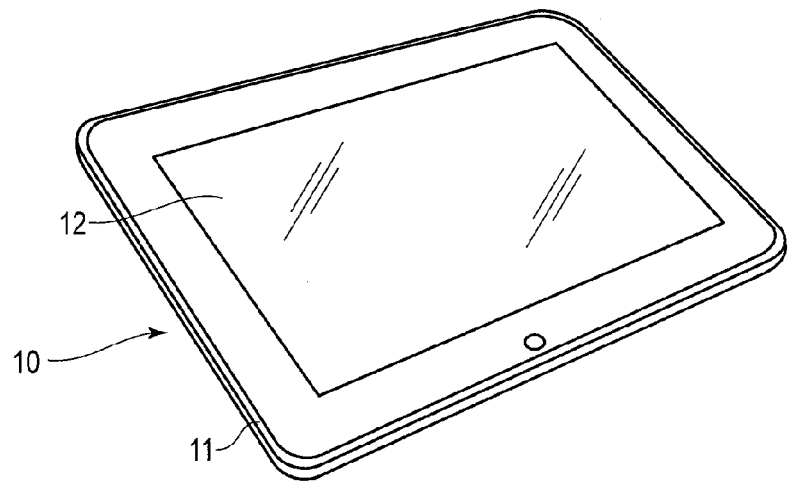
F I G. 1
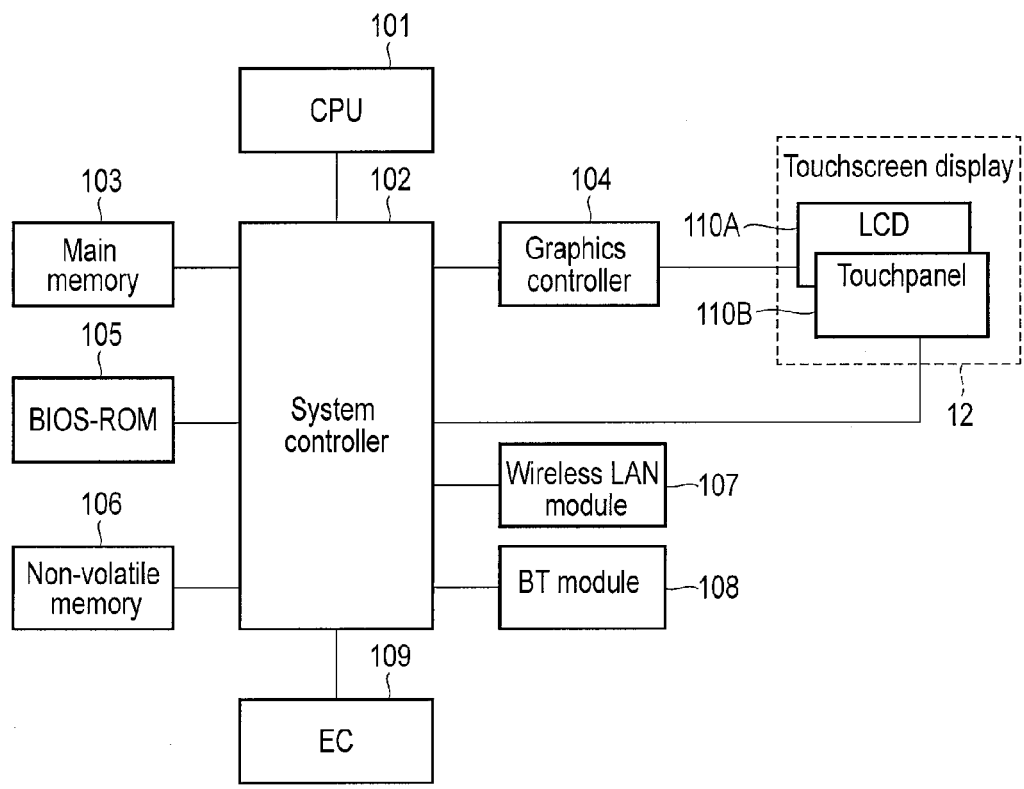
F I G. 2

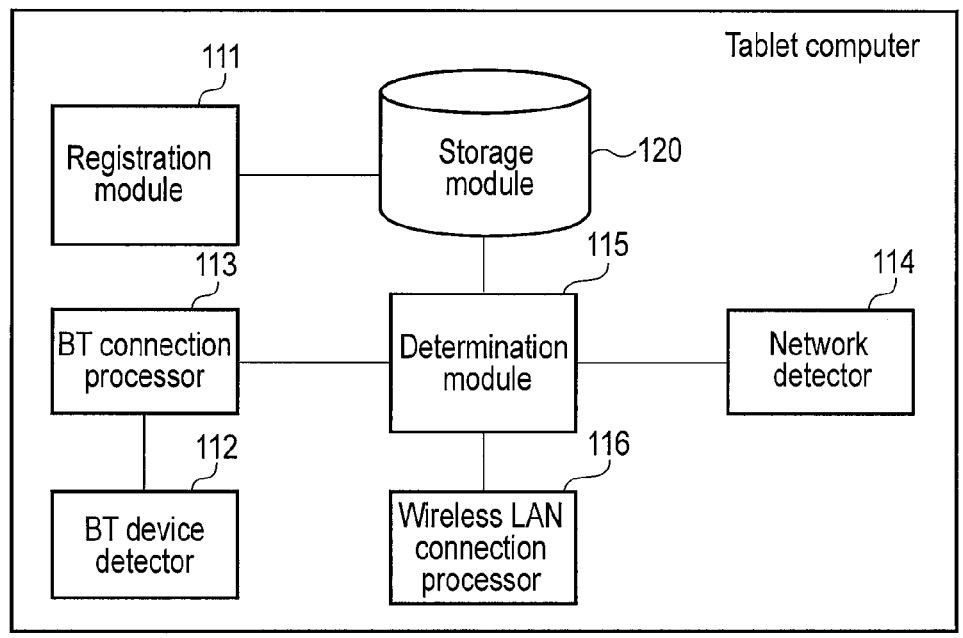
F I G. 3
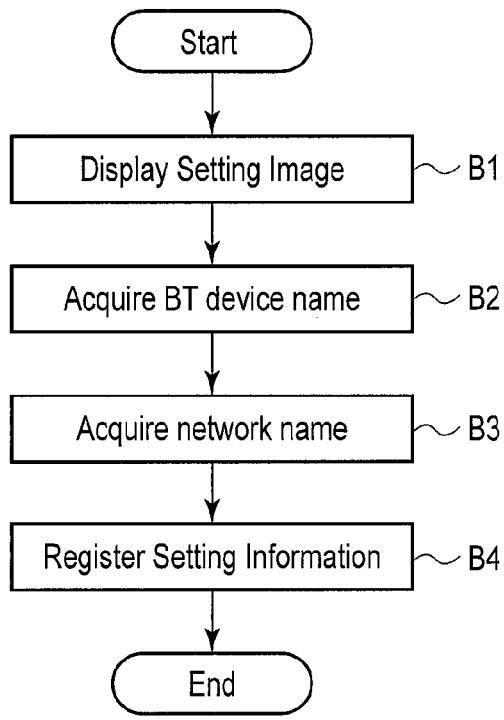
F I G. 4

ELECTRONIC DEVICE, CONNECTION DESTINATION SWITCHING METHOD AND STORAGE MEDIUM

CROSS-REFERENCE TO RELATED APPLICATIONS

This application is based upon and claims the benefit of priority from Japanese Patent Application No. 2013-244018, filed Nov. 26, 2013, the entire contents of which are incorporated herein by reference.

FIELD

Embodiments described herein relate generally to an electronic device, a connection destination switching method and a storage medium.

BACKGROUND

Currently, portable electronic devices such as tablet computers, smartphones and PDAs are a focus of development.

Generally, such electronic devices are configured to be capable of radio communication by means of a wireless LAN such as Wi-Fi (registered trademark). When using an Internet service with such an electronic device, a connection destination of the wireless LAN communication of the electronic device is assigned to an access point (for example, a wireless LAN router) provided (installed) near the device. Thus, the electronic device can be connected to the Internet via the access point.

Let us suppose a case where while the electronic device is connected to the Internet via, for example, a mobile router (access point), the user who (has) is carrying the device and mobile router enters an area (space) where there is an access point, other than the mobile router, to which the device can be connected.

In this case, to switch the connection of the wireless LAN communication from the mobile router to the other access point, the user must perform an operation of selecting a connection destination from a list of network access points recognized by the electronic device. This operation is troublesome if the user has to perform it each time the access point is to be switched.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view showing an example of the appearance of an electronic device according to an embodiment;

FIG. 2 is a block diagram showing an example of the system configuration of the electronic device;

FIG. 3 is a block diagram showing an example of the functional structure of the electronic device;

FIG. 4 is a flowchart showing an example of a procedure of a setting information registration process executed by the electronic device;

DETAILED DESCRIPTION

Figures 5, 6:
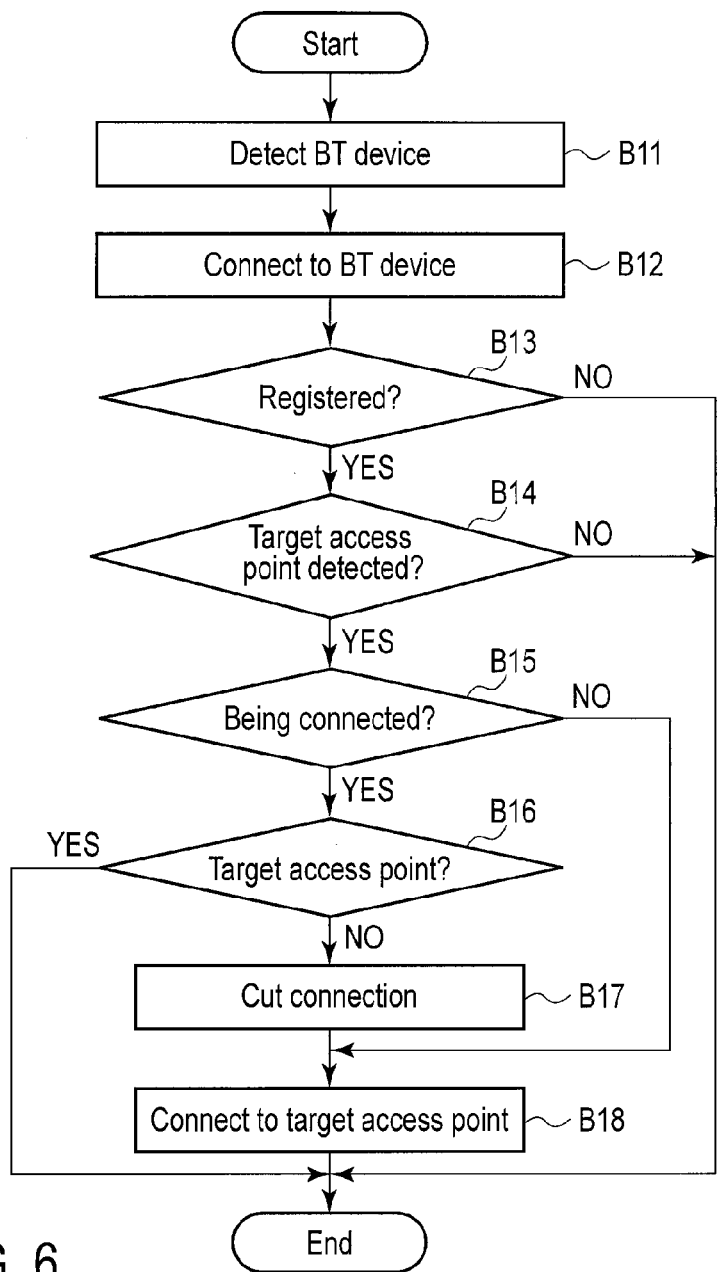
FIG. 5 is a diagram showing an example of an entry image displayed on a touchscreen display.
FIG. 6 is a flowchart diagram showing an example of a procedure of a connection destination switching process executed by the electronic device.

In general, according to one embodiment, an electronic device configured to perform a first wireless communication and a second wireless communication different from the first wireless communication, is provided. The electronic device includes a detector, a first connection processor and a second connection processor. The detector is configured to detect, when the electronic device is connected to a first apparatus which is a connection destination of the first wireless communication, a second apparatus which is a connection destination of the second wireless communication. The first connection processor is configured to connect the electronic device to the detected second apparatus. The second connection processor is configured to switch the connection destination of the first wireless communication of the electronic device from the first apparatus to a third apparatus different from the first apparatus when the second apparatus is detected or the device is connected to the second apparatus.

Embodiments will be described herein after with reference to the accompanying drawings.

FIG. 1 is a perspective view showing an example of the appearance of an electronic device according to an embodiment. This electronic device may be a mobile electronic device, and can be realized as, for example, a tablet computer, a smartphone or a PDA. The following description is provided in connection with the case where the electronic device is realized as a tablet computer 10. The tablet computer 10 is a mobile electronic device also known as a tablet or a slate computer, and a main body 10 thereof comprises a thin box-shaped housing.

The touchscreen display 12 is mounted to be overlaid on an upper surface of the main body 11. The touchscreen display 12 comprises a flat panel display and a sensor configured to detect a position of contact by, for example, a finger on a screen of the flat panel display, such as to be incorporated therein. The flat panel display may be, for example, a liquid crystal display (LCD). The sensor may be, for example, a capacitive touchpanel.

FIG. 2 shows a system configuration of the tablet computer 10 shown in FIG. 1. As can be seen in FIG. 2, the tablet computer 10 comprises, for example, a CPU 101, a system controller 102, a main memory 103, a graphics controller 104, a BIOS-ROM 105, a non-volatile memory 106, a wireless LAN module 107, a Bluetooth (registered trademark) module (BT module) 108 and an EC 109. The touchscreen display 12 of the tablet computer 10 shown in FIG. 1 comprises an LCD 110A and a touchpanel 110B.

The CPU 101 is a processor configured to control the operation of each component in the tablet computer 10. The CPU 101 can execute various types of software applications loaded into the main memory 103 from the non-volatile memory 106 which is a storage device. These software applications include the operating system (OS) and various types of application programs.

The CPU 101 can execute a basic input/output system (BIOS) stored in the BIOS-ROM 105. The BIOS is a program configured to control the hardware.

The system controller 102 is a device configured to connect a local bus of the CPU 101 and each respective one of various components to each other. The system controller 102 comprises a built-in memory controller configured to carry out access control of the main memory 103. The system controller 102 also has the function of executing communication with the graphics controller 104 via a serial bus conforming to the PCI EXPRESS standard.

The graphics controller 104 is a display controller configured to control the LCD 110A used as the touchscreen display 12 of the tablet computer 10. Display signals generated by the graphics controller 104 are sent to the LCD 110A. The LCD 110A is configured to display screen images based on the display signals. The touchpanel 110B is, for example, a capacitative pointing device configured to perform data entry on the screen of the LCD 110A. A contact position on the screen with, for example, a finger of the user, and a movement of the contact position, etc., can be detected on the touchpanel 110B. With the touchpanel 110B, a graphical user interface or the like displayed on the screen of the LCD 110A can be operated.

The wireless LAN module 107 is configured to carry out wireless communication (the first wireless communication) according to a wireless LAN standard such as Wi-Fi. With the wireless LAN module 107, the tablet computer 10 can establish wireless LAN communication with an access point (for example, a wireless LAN router) provided (installed) near the tablet computer 10. Thus, the tablet computer 10 can be connected to the Internet via the access point.

The BT module 108 is configured to execute wireless communication (the second wireless communication) with a Bluetooth-conformant device according to the Bluetooth standard.

The EC 109 is an power management controller configured to execute power management of the tablet computer 10.

FIG. 3 is a block diagram showing, mainly, the functional structure of the tablet computer 10 of the embodiment.

As shown in FIG. 3, the tablet computer 10 comprises a registration module 111, a BT device detector 112, a BT connection processor 113, a network detector 114, a determination module 115 and a wireless LAN connection processor 116. In this embodiment, the above-mentioned structural modules 111 to 116 can be realized by executing application programs loaded in the main memory 103 by the CPU 101 as shown in FIG. 2.

The tablet computer 10 further comprises a storage module 120. Various types of information stored in the storage module 120 can be managed by the above-mentioned application programs and stored on a recording medium such as an external recording medium.

The registration module 111 is configured to register (store) in the storage module 120 setting information indicating an access point (a connection destination of wireless LAN communication) corresponding to a Bluetooth-conformant device in response to user operations on the tablet computer 10.

The BT device detector 112 is configured to detect a Bluetooth-conformant device (to be referred to as a BT device) to be connected via a Bluetooth-conformant wireless communication (to be referred to as Bluetooth communication).

The BT connection processor 113 is configured to connect the tablet computer 10 to the BT device detected by the BT device detector 112.

The network detector 114 is configured to detect a device of the connection destination (access point) of wireless communication (referred to as wireless LAN communication hereinafter) by a wireless LAN, for example, Wi-Fi.

The determination module 115 is configured to determine whether or not an access point detected by the network detector 114 is an access point corresponding to a BT device detected by the BT device detector 112 based on the setting information stored in the storage module 120.

The wireless LAN connection processor 116 is configured to execute switching, when the tablet computer 10 is connected to the access point (the first apparatus), the connection destination of the wireless LAN communication from the access point to the access point (the third apparatus) corresponding to the BT device (the second apparatus) detected by the BT device detector 112 based on the results determined by the determination module 115.

As described above, the tablet computer 10 of this embodiment is configured to carry out wireless LAN communication and Bluetooth communication by means of the wireless LAN module 107 and BT module 108. Now, the settings for performing wireless LAN communication and Bluetooth communications will be briefly explained.

First, wireless LAN communication will be described. For wireless LAN communication, as described above, settings must be carried out on the tablet computer 10 with regard to the access point which is the connection destination of the wireless LAN communication.

Here, the tablet computer 10 detects an access point (or more precisely a network name preset to the access point) located within a range where the tablet computer 10 can establish wireless LAN communication therewith. Then, on the tablet computer 10, the user enters a cryptographic key corresponding to the detected access point (network name).

Next, if the cryptographic key thus entered is appropriate for the detected access point, the tablet computer 10 is connected to the target access point using the network name and cryptographic key. Thus, wireless LAN communication can be established between the tablet computer 10 and the access point.

Note that once a connection between the tablet computer 10 and an access point has been established as described above, the network name preset to the access point (referred to simply as the network name of the access point hereinafter) and the cryptographic key corresponding to the network name are stored (managed) in the tablet computer 10. The network name and cryptographic key are used the next time the tablet computer 10 is connected to the access point by the wireless LAN.

Next, Bluetooth communication will be described. For Bluetooth communication, settings (pairing) must be carried out on the tablet computer 10 with regard to the BT device which is the connection destination of the Bluetooth communication.

Here, the tablet computer 10 detects a BT device (or more precisely the name thereof) located within a range where the tablet computer 10 can establish Bluetooth communication therewith. In the pairing, Bluetooth authentication is performed between the tablet computer 10 and the detected BT device. The Bluetooth authentication is carried out by entering an identical PIN code (pass code) to, for example, the tablet computer 10 and the BT device.

When the above-described Bluetooth authentication is confirmed, the tablet computer 10 is connected to the BT device, thus enabling Bluetooth communication between the tablet computer 10 and the BT device.

In the above-described pairing, the tablet computer 10 acquires a Bluetooth device address (BD address) assigned to the BT device connected according to the Bluetooth standard. The BD address is structurally identical to an MAC address.

As described above, once a PIN code is input to the tablet computer 10 and BT device, a link key is produced in the tablet computer 10 and BT device.

Note that once the tablet computer 10 and a BT device are connected together, the device name of the BT device (referred to as the BT device name hereinafter), the BD address assigned to the BT device and the link key are stored (managed) in, for example, the tablet computer 10. The BT device name, BD address and link key are used next time the tablet computer 10 is connected to the BT device according to the Bluetooth standard.

The operation of the tablet computer 10 according to the embodiment will now be described. The tablet computer 10 of the embodiment is configured to execute the above-described process of registering setting information (referred to as the setting information registration process hereinafter) and process of switching the connection destination of wireless LAN communication (referred to as the connection destination switching process hereinafter). These processes will be described.

A procedure of the setting information registration process will be described with reference to the flowchart shown in FIG. 4. Here, for description purpose, let us assume the following case. That is, settings for performing the above-described wireless LAN communication have already been carried out on the tablet computer 10 (in other words, the tablet computer 10 has been connected to an access point of a connection destination of wireless LAN communication in the past). Further, settings for performing the above-described Bluetooth communication have already been made on the tablet computer 10 (in other words, the tablet computer 10 has been connected to a BT device of a connection destination of Bluetooth communication in the past).

As described above, when setting information is registered, the registration module 111 displays an entry image for registering setting information (referred to as the setting image hereinafter) on the touchscreen display 12 (LCD 110A) of the tablet computer 10 (block B1). The setting image may be displayed in response to, for example, an operation (instruction) of the user.

FIG. 5 is a diagram showing an example of the setting image displayed on the touchscreen display 12.

As shown in FIG. 5, the setting image is displayed in such a form that a Bluetooth device name (BT device name) and a network name can be associated with each other.

More specifically, the setting image comprises, for example, a pull-down menu button 201 associated with a Bluetooth device name. When the pull-down menu button 201 is designated by the user, a list of names of BT devices (BT device names) whose settings for carrying out Bluetooth communication with the tablet computer 10 have been carried out (that is, which have been connected to the tablet computer 10 in the past) is displayed by a pull-down menu (list).

Similarly, the setting image comprises, for example, a pull-down menu button 202 associated with a network name. When the pull-down menu button 202 is designated by the user, a list of network names of access points whose settings for carrying out wireless LAN communication with the tablet computer 10 have already been carried out (that is, which have been connected to the tablet computer 10 in the past) is displayed by a pull-down menu (list).

Let us assume that the BT device names and network names displayed in the pull-down menu are stored in the tablet computer 10 when the setting were carried out for wireless LAN communication and Bluetooth communication as described above.

In such a setting image, the user can select a desired BT device name and network name from the pull-down menu described. If the user wishes to connect the tablet computer 10 to a specific access point when the computer is connected to, for example, a specific BT device according to the Bluetooth standard, the user should select the device name of the BT device and the network name of the access point.

Thus, the BT device (BT device name) and the access point (the network name thereof) can be associated with each other on the setting image by the user.

Again, as shown in FIG. 4, the registration module 111 acquires the BT device name selected (designated) by the user from the pull-down menu on the setting image (Block B2).

Further, the registration module 111 acquires the network name selected (designated) by the user from the pull-down menu on the setting image (Block B3).

Next, the registration module 111 registers setting information including the acquired BT device name and network name which are associated with each other in a storage module 120 (Block B4).

By executing the above-described setting information registration process, the setting information indicating the access point (the network name thereof) associated with the device name (of the BT device) can be registered by operation of the user.

Next, with reference to the flowchart of FIG. 6, the procedure of a connection destination switching process will be descried. Let us assume that the tablet computer 10 has been set to be able to carry out Bluetooth communication and wireless LAN communication.

First, the BT device detector 112 detects a BT device which is a connection destination of Bluetooth communication (Block B11). In other words, the BT device detector 112 detects a BT device located within a range in which the tablet computer 10 can establish Bluetooth communication therewith. In the following description, the BT device detected by the BT device detector 112 in Block B11 will be referred to as the target BT device, and the device name of the target BT device name as target BT device name.

Let us also assume that the tablet computer 10 has already been connected to the target BT device in the past as a connection destination according to the Bluetooth communication.

The BT connection processor 113 connects the tablet computer 10 to the target BT device by means of the BT module 108 (Block B12). The connection process by the BT connection processor 113 is executed using the target BT device name stored in the tablet computer 10 in the above-described settings (pairing) for the target BT device and a BD address and link key, assigned to the target BT device etc.

Next, the determination module 115 determines with reference to the storage module 120 whether the target BT device is registered in the storage module 120 or not. More specifically, if the setting information including the target BT device name is stored in the storage module 120, it is determined that the target BT device has been registered in the storage module 120. On the other hand, if the setting information including the target BT device name is not stored in the storage module 120, it is determined that the target BT device has not been registered in the storage module 120.

When it is determined that the target BT device is registered in the storage module 120 (YES in Block B13), the determination module 115 identifies the access point (more precisely, the network name thereof) corresponding to the target BT device (more precisely, the device name thereof) indicated by the setting information. In the following description, the identified access point will be referred to as the target access point, and the network name of the target access point as the target network name.

Next, the determination module 115 determines whether the target access point (target network name) has been detected by the network detector 114 or not (Block B14). Note that the network detector 114 is configured to detect an access point (the network name thereof) located within a range where the tablet computer 10 can establish wireless LAN communication therewith.

If it is determined that the target access point has been detected (YES in Block B14), the determination module 115 determines whether or not the tablet computer 10 is connected to an access point which is a connection destination of wireless LAN communication via the wireless LAN module 107 (Block B15).

If it is determined that the access point is being connected to (YES in Block B15), the determination module 115 determines whether or not the access point being connected to is the target access point (Block B16).

If it is determined that the access point being connected to is not the target access point (NO in Block B16), the wireless LAN connection processor 116 cuts the connection between the tablet computer 10 and the access point being connected to via the wireless LAN module 107 (Block B17).

Next, the wireless LAN connection processor 116 connects the tablet computer 10 to the target access point via the wireless LAN module 107 (Block B18). The connection process of the wireless LAN connection processor 116 is executed using the cryptographic key, etc., stored in the tablet computer 10 in the above-described settings for the target access point.

With the connection destination switching process, the connection destination of wireless LAN communication can be automatically switched from the access point being connected to, to the target access point (, which corresponds to the target BT device), based on the connection between the tablet computer 10 and the target BT device.

However, if it is determined that the target BT device has not been registered in the storage module 120 (NO in Block B13), and also that the target access point has not been detected (NO in Block B14), the connection destination switching process is terminated.

Further, if it is determined that the access point being connected to is the target access point (YES in Block B16), the process of Block B17 and Block B18 is not executed, but the connection to the access point being connected to (that, is the target access point) is maintained.

Further, if it is determined as the access point not being connected to (NO in Block B16), the process of Block B18, described above, is executed.

An example of use of the tablet computer 10 of the embodiment will now be described in detail.

Let us assume in this example that the user owns a mobile router and the tablet computer 10 is connected to the mobile router (access point) as the connection destination of wireless LAN communication. In this state, the tablet computer 10 can be connected to the Internet via the mobile router, and thus the user is able to utilize the Internet services, for example, in places away from home or office.

Let us now assume the case where the user carrying the tablet computer 10 and the mobile router comes home, where a wireless router (access point) for using Wi-Fi, for example, is installed and a loudspeaker or the like is used as the BT device.

In the situation described above, if the tablet computer 10 is set in such a state that Bluetooth communication can be established, the loudspeaker of the BT device is detected by the tablet computer 10, and the loudspeaker and tablet computer 10 are connected to each other according to the Bluetooth standard. Thus, Bluetooth communication can be established between the tablet computer 10 and the loudspeaker, and, for example, an audio signal or the like output from the tablet computer 10 is reproduced from the loudspeaker.

If the wireless LAN router installed at home is assigned as an access point which corresponds to the loudspeaker (BT device), the connection destination of the tablet computer 10 in wireless LAN communication is switched from the mobile router to the wireless LAN router installed at home based on the connection between the tablet computer 10 and the loudspeaker according to the Bluetooth standard as described above.

As described above, in this embodiment, when the user comes home while using the Internet services via the access point of the mobile router by wireless LAN communication, the destination connection of wireless LAN communication of the tablet computer 10 can be automatically switched from the mobile router to the wireless LAN router at home by setting the tablet computer 10 enabled for Bluetooth communication.

There is another example of use of the tablet computer 10 of the embodiment, in which the computer is utilized as a car navigation system in a vehicle such as an automobile. This example will be described in detail.

Let us assume the following situation. That is, the user, who is not on the car, carries a mobile router and the tablet computer 10 is connected to the mobile router (access point) as the connection destination of wireless LAN communication.

Then, the user gets in the car, in which an access point for using, for example, Wi-Fi (to be referred to as the car-mounted access point) is installed. Further, in the car, a loudspeaker (to be referred to as the car-mounted loudspeaker) is used as the BT device.

In the above-described situation, if the tablet computer 10 is set to be enabled to establish Bluetooth communication, the car-mounted loudspeaker of the BT device is detected by the tablet computer 10, and the tablet computer 10 and the car-mounted loudspeaker are connected to each other according to the Bluetooth standard.

Thus, Bluetooth communication can be established between the tablet computer 10 and the car-mounted loudspeaker, and, for example, an audio signal for a navigation guidance output from the tablet computer 10 (car navigation system) can be reproduced from the car-mounted loudspeaker.

If the car-mounted access point is assigned as an access point which corresponds to the car-mounted loudspeaker (BT device), the connection destination of the tablet computer 10 in wireless LAN communication is switched from the mobile router to the car-mounted access point based on the connection between the tablet computer 10 and the loudspeaker according to the Bluetooth standard as described above.

In this case as well, when the user gets in the car while using the Internet services via the access point of the mobile router by wireless LAN communication, the destination connection of wireless LAN communication of the tablet computer 10 can be automatically switched from the mobile router to the car-mounted access point by setting the tablet computer 10 enabled for Bluetooth communication.

Note that this embodiment is described on the assumption that the connection destination (access point) of wireless LAN communication is switched if the tablet computer 10 is connected to the BT device, but it is not limited to such a situation. For example, it is also possible that the embodiment is structured as that the connection destination (access point) of wireless LAN communication can be switched upon, for example, detection of the BT device even if the tablet computer 10 has not been connected to the BT device.

As described above, in the embodiment, when the device is connected to an access point (the first apparatus) which is a connection destination of wireless LAN communication (the first wireless communication), detection of a BT device (the second apparatus) is performed, which is a connection destination of Bluetooth communication (the second wireless communication) for connecting to the BT device as a connection destination of Bluetooth communication. If the BT device is detected or the device is connected to the BT device, the connection destination of the wireless LAN communication is switched to another access point (the third apparatus). With the above-described configuration of this embodiment, the connection destination of the wireless LAN communication can be automatically switched without manually selecting a connection destination.

Further, according to this embodiment, setting information indicating an access point corresponding to a BT device is registered in the storage module 120 in response to user's operation. Therefore, the connection destination of wireless LAN communication can be switched to an appropriate access point intended by the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device configured to perform a first wireless communication and a second wireless communication different from the first wireless communication, comprising:
   a hardware processor configured to
      detect, if the electronic device is connected to a first apparatus based on the first wireless communication, a second apparatus based on the second wireless communication;
      connect the electronic device to the detected second apparatus; and
      switch the connection of the first wireless communication of the electronic device from the first apparatus to a third apparatus different from the first apparatus if the second apparatus is detected or the electronic device is connected to the second apparatus, and
   a memory connected to the hardware processor,
   wherein
      the memo is configured to store setting information indicative of the third apparatus connected to the second apparatus, and
      the hardware processor is configured to
         identify the third apparatus connected to the second apparatus based on the setting information stored in the memo if the second apparatus is detected or the electronic device is connected to the second apparatus; and
         cut the connection between the electronic device and the first apparatus and connect the electronic device to the identified third apparatus.

2. The device of claim 1, further comprising a registration controller configured to register the setting information in the storage in response to user's operation.

3. The device of claim 1, wherein
   the first wireless communication comprises a wireless LAN (Local Area Network) communication, and
   the second wireless communication comprises a Bluetooth communication.

4. A connection destination switching method comprising:
   detecting, if an electronic device is connected to a first apparatus based on a first wireless communication, a second apparatus based on a second wireless communication, wherein the electronic device is configured to perform the first wireless communication and the second wireless communication different from the first wireless communication;
   connecting the electronic device to the detected second apparatus;
   identifying a third apparatus connected to the second apparatus based on setting information stored in a memory if the second apparatus is detected or the electronic device is connected to the second apparatus, the setting information being indicative of the third apparatus which is different from the first apparatus and is based on the first wireless communication, and
   switching the connection of the first wireless communication of the electronic device from the first apparatus to the identified third apparatus if the second apparatus is detected or the electronic device is connected to the second apparatus,
   wherein the switching comprises cutting the connection between the electronic device and the first apparatus and connecting the electronic device to the third apparatus.

5. A non-transitory computer-readable storage medium having stored thereon a computer program which is executable by a computer configured to perform a first wireless communication and a second wireless communication different from the first wireless communication, the computer program comprising instructions capable of causing the computer to execute function of:
   detecting, if an electronic device is connected to a first apparatus based on a first wireless communication, a second apparatus based on a second wireless communication;
   connecting the electronic device to the detected second apparatus;
   identifying a third apparatus connected to the second apparatus based on setting information stored in a memory if the second apparatus is detected or the electronic device is connected to the second apparatus, the setting information being indicative of the third apparatus which is different from the first apparatus and is based on the first wireless communication, and
   switching the connection of the first wireless communication of the electronic device from the first apparatus to the identified third apparatus if the second apparatus is detected or the electronic device is connected to the second apparatus,
   wherein the switching comprises cutting the connection between the electronic device and the first apparatus and connecting the electronic device to the third apparatus.

* * * * *